US011364516B2

(12) United States Patent
Liu et al.

(10) Patent No.: US 11,364,516 B2
(45) Date of Patent: Jun. 21, 2022

(54) ULTRASONIC ATOMIZER WITH ACOUSTIC FOCUSING DEVICE

(71) Applicant: Ford Motor Company, Dearborn, MI (US)

(72) Inventors: Wanjiao Liu, Ann Arbor, MI (US); Kevin Richard John Ellwood, Ann Arbor, MI (US); Mark Edward Nichols, Saline, MI (US); Christopher Michael Seubert, New Hudson, MI (US)

(73) Assignee: Ford Motor Company, Dearborn, MI (US)

( * ) Notice: Subject to any disclaimer, the term of this patent is extended or adjusted under 35 U.S.C. 154(b) by 101 days.

(21) Appl. No.: 16/211,324

(22) Filed: Dec. 6, 2018

(65) Prior Publication Data

US 2019/0232318 A1 Aug. 1, 2019

Related U.S. Application Data

(60) Provisional application No. 62/624,013, filed on Jan. 30, 2018.

(51) Int. Cl.
*B05B 17/00* (2006.01)
*B05B 17/06* (2006.01)
(Continued)

(52) U.S. Cl.
CPC .......... *B05B 17/0646* (2013.01); *B05B 1/262* (2013.01); *B05B 3/02* (2013.01);
(Continued)

(58) Field of Classification Search
CPC .. B25J 11/0075; B05B 17/0646; B05B 17/06; B05B 17/067; B05B 17/063; B05B 17/0653; B05B 17/0669; B05B 13/0431; B05B 13/0452; B05B 1/262; B05B 3/02; B05B 3/14; B05B 15/628; B05B 15/68;
(Continued)

(56) References Cited

U.S. PATENT DOCUMENTS 3,647,137 A * 3/1972 Naydan .................. F04F 99/00 60/221
4,038,570 A 7/1977 Durley, III
(Continued)

FOREIGN PATENT DOCUMENTS

CN 103736620 4/2014
CN 104689946 6/2015
(Continued)

OTHER PUBLICATIONS

Ransburg, Evolver 303 Dual Purge Solventbome Robotic Atomizers, Model: A12374-XXX, Service Manual AA-08-01.5, May 2015.
(Continued)

*Primary Examiner* — Joseph A Greenlund
(74) *Attorney, Agent, or Firm* — Burris Law, PLLC

(57) ABSTRACT

An atomizer for applying a coating includes a nozzle plate, an actuator, and an acoustic focusing device. The nozzle plate defines at least one aperture. The actuator is configured to oscillate to form pressure waves within a fluid to eject the fluid from the nozzle plate. The acoustic focusing device focuses the pressure waves toward the apertures.

16 Claims, 7 Drawing Sheets

Figure 1:
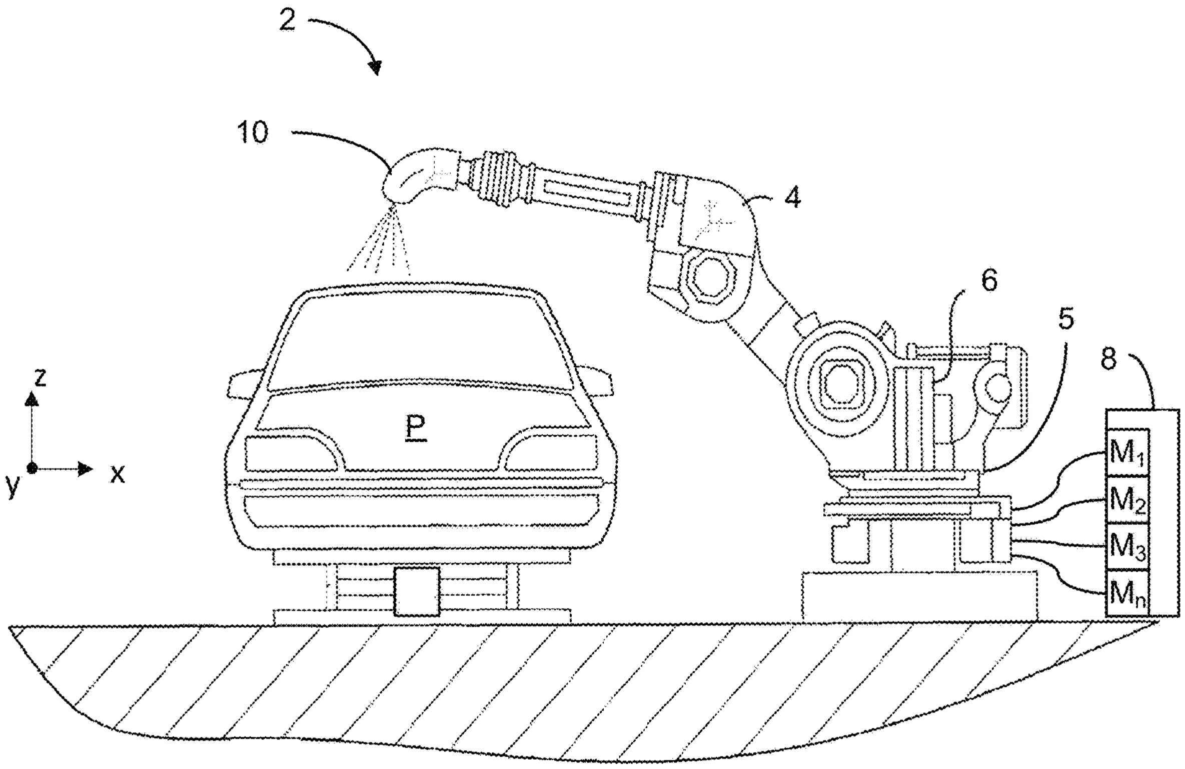

(51) Int. Cl.

| | |
|---|---|
| ***B05B 3/14*** | (2006.01) |
| ***B05B 13/04*** | (2006.01) |
| ***B05B 3/02*** | (2006.01) |
| ***B05B 15/628*** | (2018.01) |
| ***B05B 12/36*** | (2018.01) |
| ***B05B 15/625*** | (2018.01) |
| ***B05B 12/16*** | (2018.01) |
| ***B05B 7/14*** | (2006.01) |
| ***B25J 11/00*** | (2006.01) |
| ***B05B 12/00*** | (2018.01) |
| ***B05B 15/68*** | (2018.01) |
| ***B05B 1/26*** | (2006.01) |
| ***B05D 1/02*** | (2006.01) |
| ***B05B 15/00*** | (2018.01) |
| ***B05D 1/12*** | (2006.01) |
| ***B05D 3/06*** | (2006.01) |

(52) U.S. Cl.

CPC .............. *B05B 3/14* (2013.01); *B05B 7/1481* (2013.01); *B05B 12/00* (2013.01); *B05B 12/16* (2018.02); *B05B 12/36* (2018.02); *B05B 13/0431* (2013.01); *B05B 13/0452* (2013.01); *B05B 15/00* (2013.01); *B05B 15/625* (2018.02); *B05B 15/628* (2018.02); *B05B 15/68* (2018.02); *B05B 17/06* (2013.01); *B05B 17/063* (2013.01); *B05B 17/0653* (2013.01); *B05B 17/0669* (2013.01); *B05D 1/02* (2013.01); *B05D 1/12* (2013.01); *B05D 3/067* (2013.01); *B25J 11/0075* (2013.01)

(58) Field of Classification Search

CPC .. B05B 15/625; B41J 2/14008; B41J 2202/15

USPC ............................................ 347/46; 310/355

See application file for complete search history.

(56) References Cited

U.S. PATENT DOCUMENTS 4,308,547 A * 12/1981 Lovelady ............. B41J 2/14008 310/366
4,384,231 A * 5/1983 Ishikawa ................ G10K 11/30 29/25.35
4,751,534 A * 6/1988 Elrod ................... B41J 2/14008 347/46
5,028,937 A * 7/1991 Khuri-Yakub ....... B41J 2/14008 347/46
5,111,220 A * 5/1992 Hadimioglu ......... B41J 2/14008 347/85
5,121,141 A * 6/1992 Hadimoglu .......... B41J 2/14008 347/85
5,229,793 A * 7/1993 Hadimioglu ......... B41J 2/14008 347/85
5,387,444 A 2/1995 Bachmann
5,516,043 A 5/1996 Manna et al.
5,540,384 A 7/1996 Erickson et al.
5,624,075 A 4/1997 Dankert
5,636,798 A 6/1997 Buschor
5,669,971 A * 9/1997 Bok ..................... H05K 3/0091 118/313
5,705,079 A * 1/1998 Elledge ................... C03C 15/00 216/33
5,823,428 A * 10/1998 Humberstone ..... B05B 17/0684 239/4
6,136,210 A * 10/2000 Biegelsen .............. B41J 2/1634 216/97
6,154,235 A * 11/2000 Fukumoto .................. B41J 2/14 347/46
6,168,666 B1 * 1/2001 Sun ........................... B05B 5/08 118/308
6,394,363 B1 5/2002 Arnott et al.
6,474,783 B1 * 11/2002 Pilossof ............... B41J 2/14008 347/51
6,508,196 B1 * 1/2003 Hansson .............. B23K 3/0607 417/322
6,596,239 B2 * 7/2003 Williams ............. B01J 19/0046 347/46
6,666,835 B2 12/2003 Martin et al.
6,755,985 B2 6/2004 Fiala et al.
7,168,633 B2 1/2007 Wang et al.
7,350,890 B2 4/2008 Baird et al.
7,550,897 B2 6/2009 Hailes
7,704,564 B2 4/2010 DeRegge et al.
7,712,679 B2 * 5/2010 Onozawa ................. B41J 2/215 239/102.1
7,934,665 B2 5/2011 Erickson et al.
7,976,135 B2 7/2011 Brown et al.
7,977,849 B2 7/2011 Hailes et al.
8,191,982 B2 6/2012 Brown et al.
8,317,299 B2 11/2012 Brown
8,440,014 B2 5/2013 Kitamura et al.
8,524,330 B2 9/2013 Fan et al.
8,821,802 B2 9/2014 Haran
8,991,982 B2 * 3/2015 Yamasaki ............ B41J 2/14233 347/92
9,027,548 B2 * 5/2015 Borgschulte ...... A61M 15/0085 128/200.16
9,149,750 B2 10/2015 Steele et al.
9,156,049 B2 10/2015 Galluzzo et al.
9,452,442 B2 9/2016 Selby et al.
9,592,524 B2 * 3/2017 Fritz ....................... B05B 5/025
10,144,030 B2 * 12/2018 Fang ................... B05B 17/0638
10,974,271 B2 * 4/2021 Crichton ............. B05B 17/0638
2002/0021328 A1 * 2/2002 Aizawa ................ B41J 2/14008 347/50
2002/0037359 A1 * 3/2002 Mutz .................... B01J 19/0046 530/399
2002/0063751 A1 * 5/2002 Aizawa ................ B41J 2/14008 347/46
2002/0096578 A1 * 7/2002 Al-Jiboory .............. B08B 3/123 239/102.1
2005/0136190 A1 * 6/2005 Tani .......................... B05B 5/04 239/223
2006/0005766 A1 1/2006 Gorges et al.
2006/0210443 A1 * 9/2006 Stearns ................... B05B 5/005 422/400
2007/0051827 A1 * 3/2007 Shen ................... B05B 17/0646 239/548
2007/0102537 A1 5/2007 Stauch et al.
2008/0001003 A1 * 1/2008 Onozawa ................. B41J 2/215 239/102.2
2009/0115820 A1 * 5/2009 Nomura ............... B41J 2/14008 347/68
2010/0183820 A1 7/2010 Seubert et al.
2010/0285234 A1 11/2010 Van Den Berg et al.
2013/0079732 A1 * 3/2013 Burt ...................... B05B 7/0012 604/290
2013/0112770 A1 * 5/2013 Hsieh .................. B05B 17/0638 239/102.1
2013/0284833 A1 * 10/2013 Fritz ......................... B05B 1/14 239/102.1
2014/0110500 A1 * 4/2014 Crichton ............. B05B 17/0646 239/102.2
2016/0059262 A1 3/2016 Seyler
2016/0158789 A1 * 6/2016 Selby .................... B05B 7/2408 239/548
2016/0228902 A1 * 8/2016 Crichton ............... A61M 35/00
2018/0036498 A1 * 2/2018 Atkinson .............. A61M 15/08
2018/0297053 A1 * 10/2018 Buckland ............ B05B 17/0638
2019/0232317 A1 * 8/2019 Seubert ................... B05B 12/36
2019/0232318 A1 * 8/2019 Liu ....................... B05B 15/628
2019/0232320 A1 * 8/2019 Liu ...................... B25J 11/0075
2019/0232321 A1 * 8/2019 Seubert ............... B05B 17/0646
2019/0232322 A1 * 8/2019 Ellwood ............... B05B 15/625
2019/0232323 A1 * 8/2019 Adams .................... B05B 12/14
2021/0370576 A1 * 12/2021 Smith ..................... B29C 53/36

(56) References Cited

U.S. PATENT DOCUMENTS

FOREIGN PATENT DOCUMENTS

| | | |
|---|---|---|
| CN | 104841592 | 8/2015 |
| DE | 19631811 | 2/1998 |
| DE | 20023848 | 12/2006 |
| DE | 102011088373 | 6/2013 |
| DE | 102013205171 | 9/2014 |
| EP | 1884365 | 2/2008 |
| GB | 2215240 | 9/1989 |
| JP | H0538809 | 2/1993 |
| JP | H08215616 | 8/1996 |
| JP | 2003091010 | 3/2003 |
| KR | 20180080977 | 7/2018 |
| WO | 2018108572 | 6/2018 |
| WO | 2018162872 | 9/2018 |

OTHER PUBLICATIONS

Regan, Michael, UV Coatings: Curing at Light-Speed, BodyShop Business, May 1, 2005.

Hielscher—Ultrasound Technology, Ultrasonic Spraying, Nebulizing, and Atomizing, Sep. 17, 2018.

IEEE Globalspec, Equipment information page for Spray Guns and Applicators Information, available at URL https://www.globalspec.com/learnmore/manufacturing_process_equipment/surface_coating_protection/coating_paint_spray_guns.

Beswick Engineering, The Basics of Quick Disconnects, product information pages, Beswick Engineering Co., Inc.

* cited by examiner

ULTRASONIC ATOMIZER WITH ACOUSTIC FOCUSING DEVICE

CROSS-REFERENCE TO RELATED APPLICATIONS

This application claims priority to provisional application 62/624,013 filed on Jan. 30, 2018. The disclosure of the above application is incorporated herein by reference.

FIELD

The present disclosure relates to high volume coating equipment and more specifically a fluid atomizer with a focusing device.

BACKGROUND

The statements in this section merely provide background information related to the present disclosure and may not constitute prior art.

Coating automotive vehicles (e.g., vehicle frames, bodies, panels, etc.) with coatings (e.g., primer, basecoat, clearcoat, etc.) in a high-volume production environment involves substantial capital cost, not only for application and control of the coating, but also for equipment to capture overspray. The overspray can be up to 40% of the coating that exits an applicator, or in other words, up to 40% of the coating that is purchased and applied is wasted (i.e. the transfer efficiency is ~60%). Equipment that captures overspray involves significant capital expenses when a paint shop is constructed, including large air handling systems to carry overspray down through a paint booth, construction of a continuous stream of water that flows under a floor of the paint booth to capture the overspray, filtration systems, and abatement, among others. In addition, costs to operate the equipment is high because air (flowing at greater than 200,000 cubic feet per minute) that flows through the paint booths must be conditioned, the flow of water must be maintained, compressed air must be supplied, and complex electrostatics are employed to improve transfer efficiency.

With known production equipment, the liquid coating is atomized by a nozzle that includes a rotating bell, which is essentially a rotating disk or bowl that spins at about 20,000-80,000 revolutions per minute. The liquid is typically ejected from an annular slot on a face of the rotating disk and is propelled towards the edges of the bell via centrifugal force. The liquid then forms ligaments and then droplets at the edges of the bell. Although this equipment works for its intended purpose, various issues arise as a result of its design. First, the momentum of the liquid coating is mostly lateral, meaning it is moving in a direction parallel to the vehicle rather than towards the vehicle. To compensate for this movement, shaping air is applied that redirects the liquid droplets towards the vehicle. In addition, electrostatics are used to steer the droplets towards the vehicle. The droplets have a fairly wide size distribution, which can cause appearance issues.

Ultrasonic atomization is an efficient means of producing droplets with a narrow size distribution with a droplet momentum perpendicular to the applicator surface (e.g., towards a surface of a vehicle). However, viscous coatings can require large amounts of energy to be ejected from the small aperture size used for ultrasonic atomization.

The present disclosure addresses these issues associated with traditional high-volume production paint booth operations.

SUMMARY

This section provides a general summary of the disclosure and is not a comprehensive disclosure of its full scope or all of its features.

In one form, an atomizer for applying a coating includes a nozzle plate, an actuator, and an acoustic focusing device. The nozzle plate defines at least one aperture. The actuator is configured to oscillate the nozzle plate to form pressure waves within fluid to eject the fluid from the nozzle plate. The acoustic focusing device is configured to focus the pressure waves toward the at least one aperture. In a variety of alternate forms of the present disclosure: the acoustic focusing device is an acoustic reflector that has a concave shaped side facing toward the nozzle plate; a focal point of the acoustic focusing device is at the at least one aperture; the at least one aperture is a plurality of apertures; the acoustic focusing device focuses the pressure wave toward the plurality of apertures; the atomizer further includes a plurality of the acoustic focusing devices, each acoustic focusing device focusing the pressure wave toward a corresponding one of the apertures; the atomizer further includes a plurality of the nozzle plates and a plurality of the actuators, each actuator configured to oscillate a corresponding one of the nozzle plates, wherein the atomizer includes a plurality of acoustic focusing device, each acoustic focusing device associated with a corresponding one of the nozzle plates; the actuator is integrally formed with the nozzle plate; the actuator is piezoelectric material.

In another form, an atomizer for applying a coating includes a nozzle plate, an actuator, and an acoustic focusing device. The nozzle plate defines at least one aperture. The actuator is configured to oscillate a fluid to form a pressure wave in the fluid. The acoustic focusing device is disposed between the actuator and the nozzle plate and configured to focus the pressure wave toward the at least one aperture. In a variety of alternate forms of the present disclosure: the acoustic focusing device is an acoustic lens that has a concave shaped side facing toward the at least one aperture; the acoustic focusing device is configured such that a speed of sound through the acoustic focusing device varies along the acoustic focusing device to focus the pressure wave toward the at least one aperture; the acoustic focusing device includes a planar body disposed parallel to the nozzle plate, the speed of sound through the planar body varying through the planar body to focus the pressure wave toward the at least one aperture; a density of the acoustic focusing device varies along the acoustic focusing device to focus the pressure wave toward the at least one aperture; the at least one aperture is a plurality of apertures; the acoustic focusing device focuses the pressure wave toward the plurality of apertures; the atomizer further includes a plurality of the acoustic focusing device, each acoustic focusing device focusing the pressure wave toward a corresponding one of the apertures; the atomizer further includes a plurality of the nozzle plates and a plurality of the actuators, each actuator configured to oscillate a corresponding one of the nozzle plates, wherein the atomizer includes a plurality of acoustic focusing device, each acoustic focusing device associated with a corresponding one of the nozzle plates.

In yet another form, an atomizer for applying a coating includes a nozzle plate, an actuator, and a reservoir. The nozzle plate defines an aperture. The actuator is spaced apart from the nozzle plate. The reservoir is between the nozzle plate and the actuator. The actuator is configured to oscillate to form a pressure wave through fluid in the reservoir. The actuator is shaped to focus the pressure wave so that the pressure wave becomes more focused with increased proximity to the nozzle plate. In one of a variety of alternate forms of the present disclosure: the actuator is a piezoelectric element having a curved shape, the curved shape having a focal point toward the nozzle plate.

Further areas of applicability will become apparent from the description provided herein. It should be understood that the description and specific examples are intended for purposes of illustration only and are not intended to limit the scope of the present disclosure.

DRAWINGS

Figure 2:
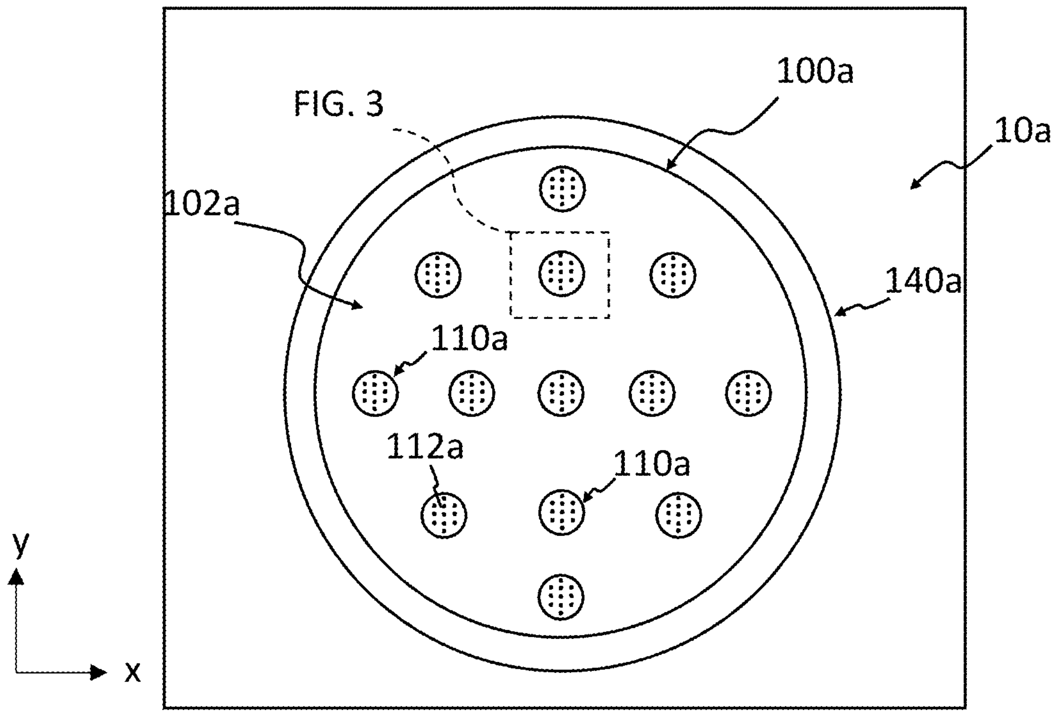
Figure 3:
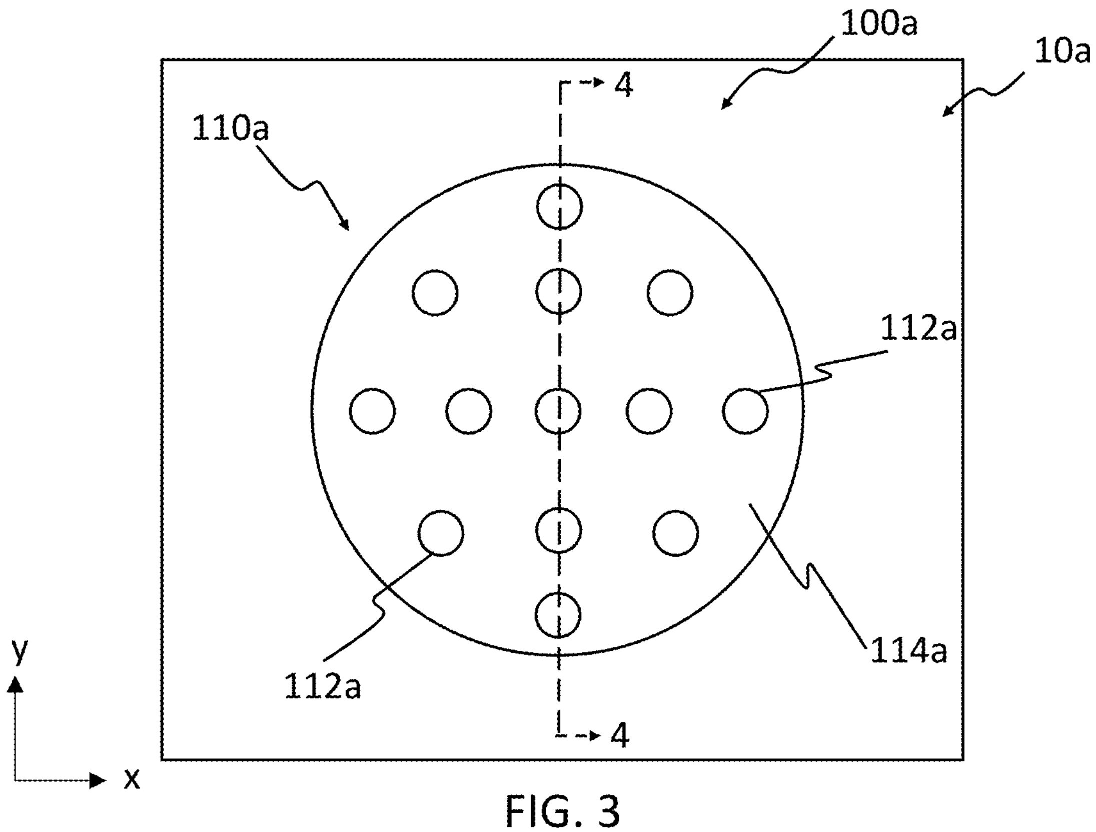
Figure 4:
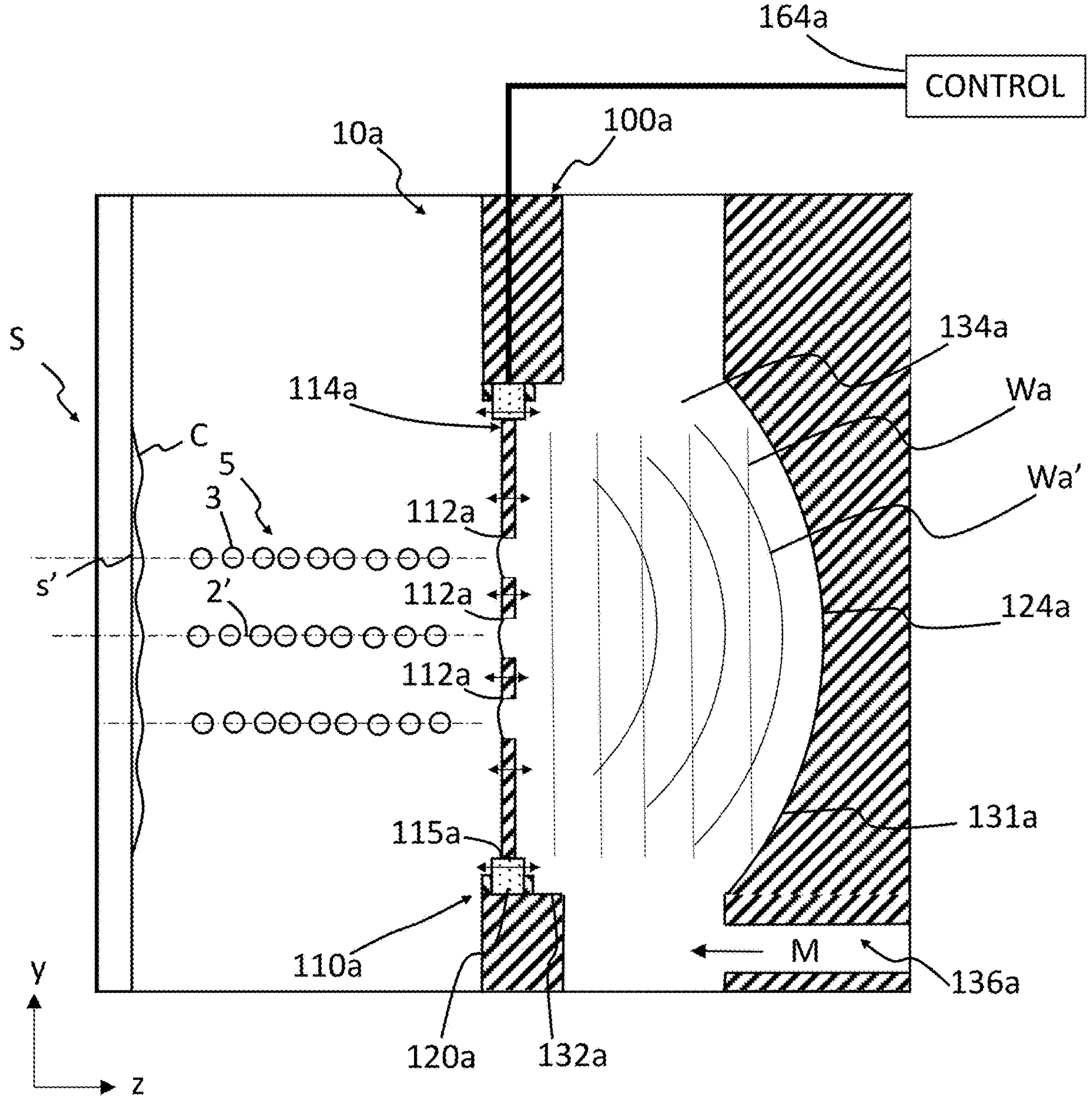
Figure 5:
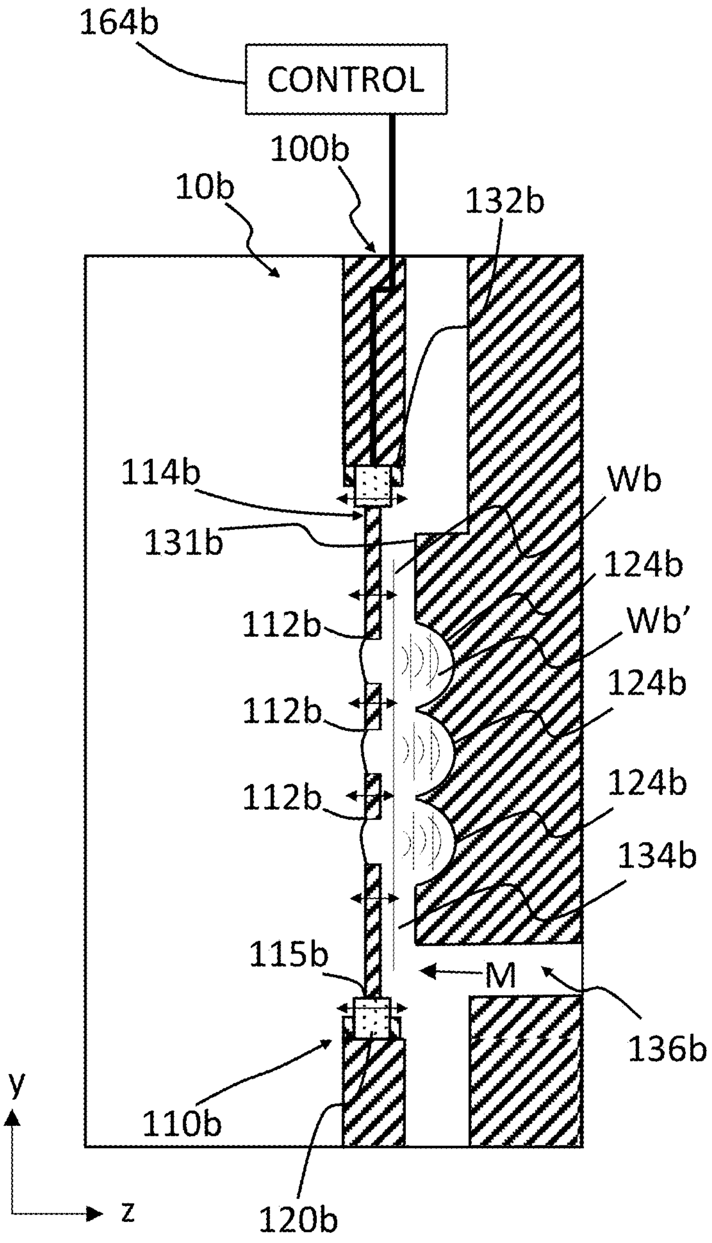
Figure 6:
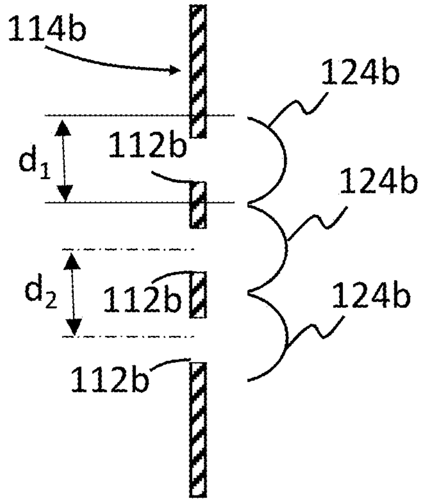
Figure 7:
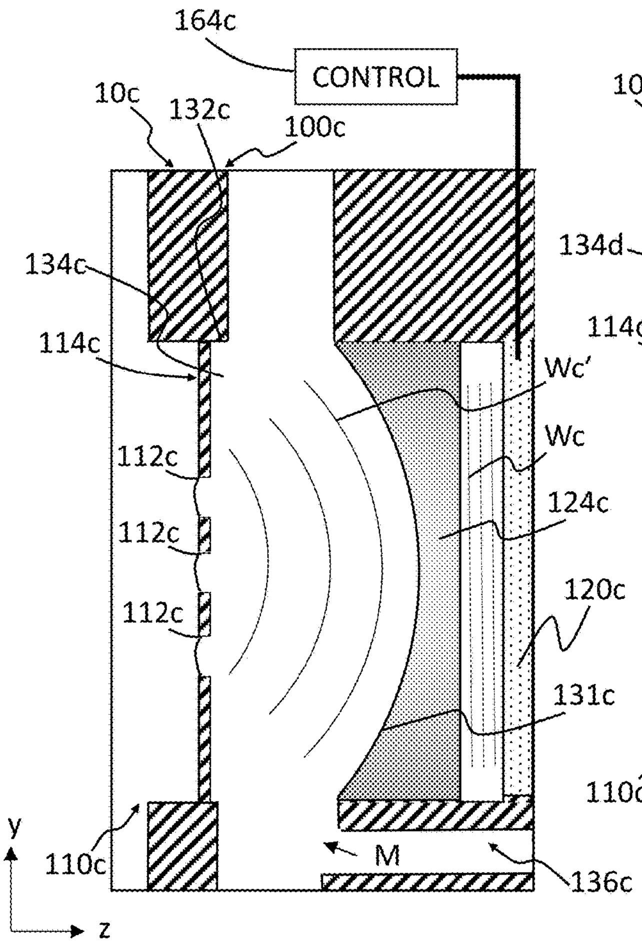
Figure 8:
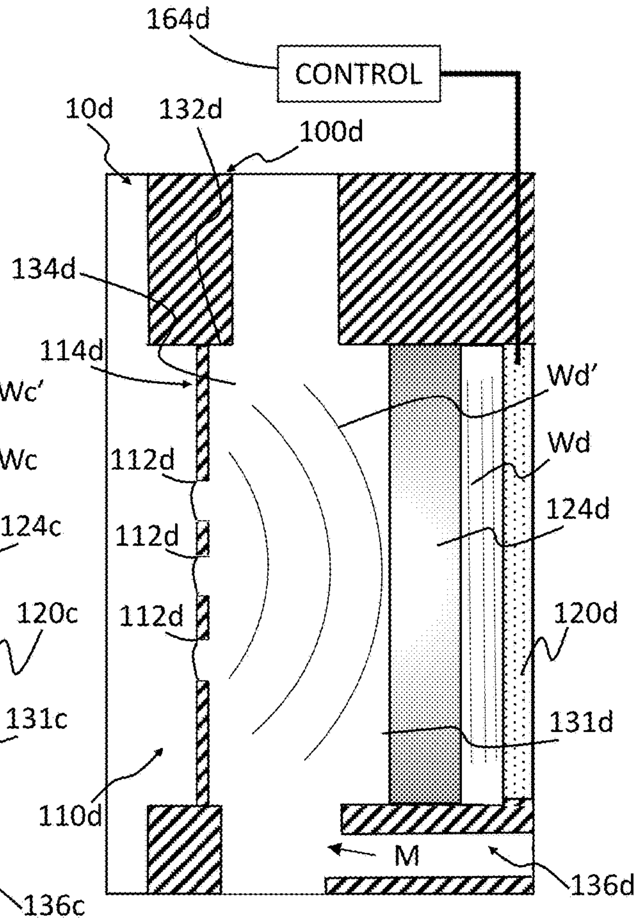
Figure 9:
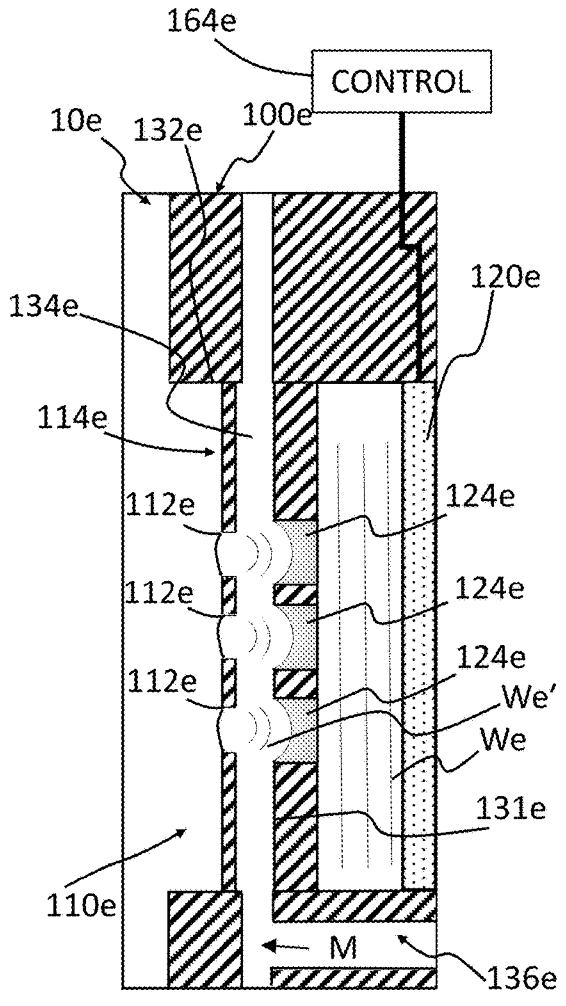
Figure 10:
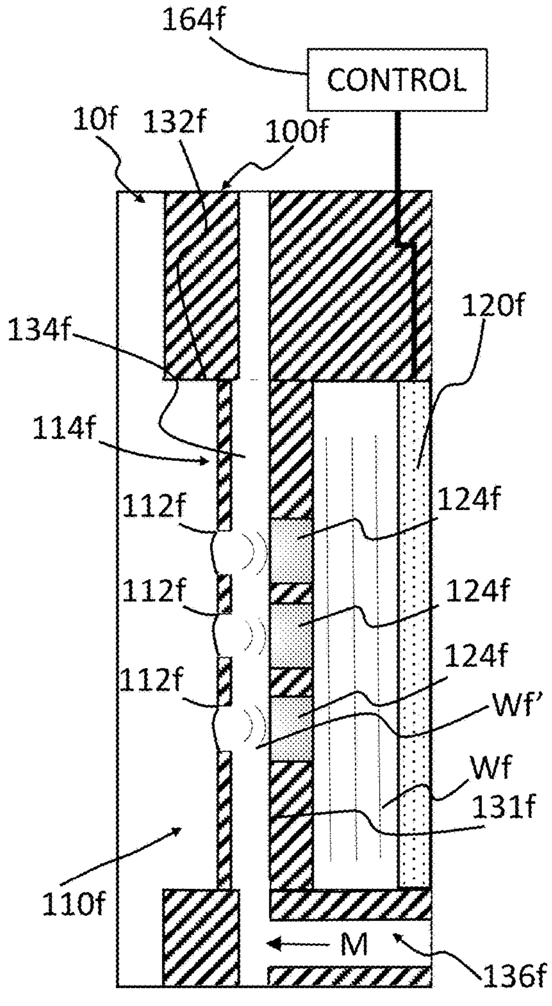
Figure 11:
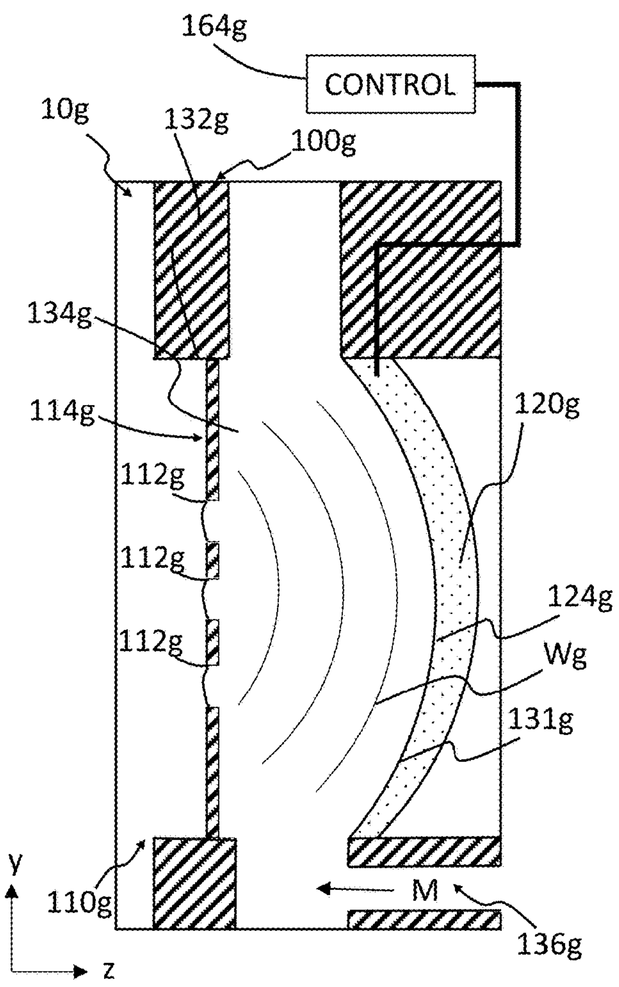
Figure 12:
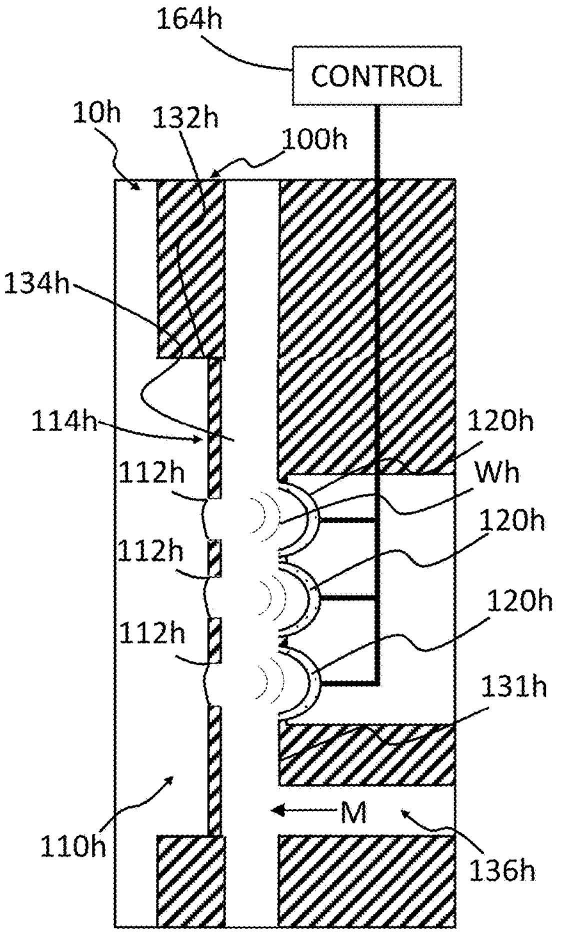

In order that the disclosure may be well understood, there will now be described various forms thereof, given by way of example, reference being made to the accompanying drawings, in which:

FIG. 1 is a planar view of an exemplary coating spray system according to the teachings of the present disclosure;

FIG. 2 schematically depicts a planar view of an applicator of the spray system of FIG. 1, having an array of micro-applicators according to the teachings of the present disclosure;

FIG. 3 schematically depicts a portion of the applicator of FIG. 2, illustrating one of the micro-applicators;

FIG. 4 schematically depicts a side cross-sectional view of section 4-4 in FIG. 3, illustrating a nozzle with an acoustic focusing device according to the teachings of the present disclosure;

FIG. 5 schematically depicts a side cross-sectional view similar to FIG. 4, illustrating a nozzle with an acoustic focusing device of a second construction according to the teachings of the present disclosure;

FIG. 6 schematically depicts a portion of the side cross-sectional view of FIG. 5;

FIG. 7 schematically depicts a side cross-sectional view similar to FIG. 4, illustrating a nozzle with an acoustic focusing device of a third construction according to the teachings of the present disclosure;

FIG. 8 schematically depicts a side cross-sectional view similar to FIG. 4, illustrating a nozzle with an acoustic focusing device of a fourth construction according to the teachings of the present disclosure;

FIG. 9 schematically depicts a side cross-sectional view similar to FIG. 4, illustrating a nozzle with an acoustic focusing device of a fifth construction according to the teachings of the present disclosure;

FIG. 10 schematically depicts a side cross-sectional view similar to FIG. 4, illustrating a nozzle with an acoustic focusing device of a sixth construction according to the teachings of the present disclosure;

FIG. 11 schematically depicts a side cross-sectional view similar to FIG. 4, illustrating a nozzle with an acoustic focusing device of a seventh construction according to the teachings of the present disclosure; and FIG. 12 schematically depicts a side cross-sectional view similar to FIG. 4, illustrating a nozzle with an acoustic focusing device of an eighth construction according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of devices, methods, and systems for controlling the application of paint to automotive vehicles in a high production environment, which reduce overspray and increase transfer efficiency of the paint. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Referring now to FIG. 1, a paint spray system 2 for painting a part P using a robotic arm 4 is schematically depicted. The robotic arm 4 is coupled to at least one material applicator 10 and a rack 5. A material source 8 (e.g., a paint source) is included and includes at least one material M (materials $M_1$, $M_2$, $M_3$, . . . $M_n$ shown in FIG. 1; also referred to herein simply as "material M"). In some aspects of the present disclosure the at least one material M includes different paint materials, different adhesive materials, different sealant materials, and the like. The arm 4 moves according to xyz coordinates with respect to rack 4 such that the material applicator 10 moves across a surface (not labeled) of the part P. Also, a power source 6 is configured to supply power to arm 4 and rack 5. Arm 4 and rack 5 are configured to supply material M from the material source 8 to the material applicator 10 such that a coating is applied to the surface of the part P.

Referring to FIG. 2 a material applicator 10*a* or atomizer according to the teachings of the present disclosure is schematically shown. In one form of the present disclosure, the material applicator 10*a* includes an array body 100*a* or nozzle with an applicator array 102*a* including a plurality of micro-applicators 110*a* or sub-nozzles. In some aspects of the present disclosure, the array body 100*a* with the applicator array 102*a* is positioned on a base 140*a*. In one configuration, the base 140*a* is supported at the end of the articulating robotic arm 4 (FIG. 1). In another configuration, the base 140*a* is supported by a spray bar (not shown) which can be stationary or can move in one, two, or three dimensions relative to a substrate S (shown in FIG. 4). Each of the micro-applicators 110*a* includes a plurality of apertures 112*a* through which a material M (FIG. 4) is ejected such that atomized droplets 3 (FIG. 4) of the material is provided. As described above, the material M (FIG. 4) is generally a liquid material (e.g., primer, basecoat, clearcoat, etc.) but may optionally include interspersed solids, such as metallic flecks or other particles to provide a particular aesthetic look. The micro-applicators 110*a* can be arranged in any arrangement, such as a regular or an irregular pattern across the array body 100*a*.

Referring to FIGS. 3 and 4, each of the micro-applicators 110*a* includes a micro-applicator plate 114*a*, an actuator 120*a*, and an acoustic focusing device 124*a*. Each micro-applicator plate 114*a* defines a plurality of the apertures 112*a* extending through the micro-applicator plate 114*a*. The actuator 120*a* can be a transducer such as a piezoelectric material. The micro-applicator plate 114*a* is in mechanical communication with the actuator 120*a* such that activation of the actuator 120*a* (e.g., providing electrical power to the actuator 120*a*) vibrates or oscillates the micro-applicator plate 114*a* as schematically depicted by the horizontal (z-direction) double-headed arrows in FIG. 4.

In the example provided, the array body 100*a* includes a material inlet 136*a* corresponding to each micro-applicator 110*a*. The array body 100*a* includes a back wall 131*a* and a cylindrical sidewall 132*a*. A reservoir 134*a* for containing the material M is defined between the back wall 131*a* and the micro-applicator plate 114*a*. In the example provided, at least the back wall 131*a* and the side of the micro-applicator plate 114*a* that faces the back wall 131*a* cooperate to define the reservoir 134*a*. In the example provided, the reservoir 134*a* is in fluid communication with similar reservoirs of the other micro-applicators 110*a* shown in FIG. 2, such that all of the micro-applicators 110*a* share a common fluid chamber. In an alternative configuration, not specifically shown, the reservoirs of some or all of the micro-applicators 110*a* can be separate from each other.

The inlet 136*a* is in fluid communication with the reservoir 134*a* such that the material M flows through the inlet 136*a* and into the reservoir 134*a*. In the example provided, the actuator 120*a* is positioned between the micro-applicator plate 114*a* and the sidewall 132*a* so that the array body 100*a* supports the actuator 120*a* and the actuator 120*a* supports the micro-applicator plate 114*a*. For example, the actuator 120*a* may be positioned between an outer edge surface 115*a* of the micro-applicator plate 114*a* and an inner surface of the array body 100*a*. In one configuration, the actuator 120*a* is an annular shape disposed about the micro-applicator plate 114*a*. In another configuration, not specifically shown, the actuator 120*a* can be integrally formed with the micro-applicator plate 114*a* such that supplying power to the micro-applicator plate 114*a* oscillates the plate 114*a*. In the example provided, a control module 164*a* is in electric communication with the actuator 120*a* to provide power to and control operation of the actuator 120*a*.

In the example provided, the back wall 131*a*, or a portion thereof, has a concave shaped surface that faces toward the micro-applicator plate 114*a* to define the acoustic focusing device 124*a*. In the example provided, the acoustic focusing device 124*a* is an acoustic reflector or acoustic mirror that has a curvature, such as parabolic or spherical for example, that has a focal point proximate to the apertures 112*a* of the micro-applicator plate 114*a*. The focal point can be within the reservoir 134*a*, at the micro-applicator plate 114*a*, or exterior of the micro-applicator plate 114*a*.

In operation, the material M is supplied to the reservoir 134*a* at a very low pressure or no pressure, such that surface tension of the material M resists the material M from flowing through the apertures 112*a* of the micro-applicator plate 114*a* unless the actuator 120*a* is activated and oscillates. The oscillating micro-applicator plate 114*a* produces primary waves Wa that propagate from the micro-applicator plate 114*a* toward the back wall 131*a*. The primary waves Wa reflect off the acoustic focusing device 124*a* as secondary waves Wa' that travel toward the micro-applicator plate 114*a*. In the example provided, the primary waves Wa are generally unfocused, parallel waves. The acoustic focusing device 124*a* focuses the waves such that the secondary waves Wa' are focused or concentrated toward the apertures 112*a*. This focused wave energy causes the material M to be ejected from the apertures 112*a*. In the example provided, the secondary waves Wa' impact the micro-applicator plate 114*a* across an area that encompasses all of the apertures 112*a*, but less than the entire oscillating micro-applicator plate 114*a*. Thus, the wave energy is concentrated at the apertures 112*a* to eject the material M.

That is, when the actuator 120*a* is activated and vibrates, the material M is ejected through and/or from the plurality of apertures 112*a* to provide a stream 5 of atomized droplets 3. The stream 5 of atomized droplets 3 propagates generally parallel to a micro-applicator axis 2' and forms a coating C on a surface s' of the substrate S. The substrate S can be any suitable workpiece such as a vehicle part, frame, or body for example. As schematically depicted in FIG. 4, the atomized droplets 3 have a narrow droplet size distribution (e.g., average droplet diameter).

Referring to FIG. 5, a cross-section of a material applicator 10*b* of a second construction is illustrated. The material applicator 10*b* is similar to the material applicator 10 and 10*a* (FIGS. 1-4) except as otherwise shown or described herein. Features denoted with reference numerals similar to those shown and described in FIGS. 1-4 are similar to those features of applicator 10, 10*a* and only differences are described herein. The back wall 131*b* of the material applicator 10*b* includes a plurality of acoustic focusing devices 124*b* that are acoustic mirrors or reflectors. Each acoustic focusing device 124*b* is associated with a corresponding one of the apertures 112*b* and has a focal point proximate to that aperture 112*b*. Similar to the applicator 10, 10*a* (FIGS. 1-4), oscillation of the micro-applicator plate 114*b* produces parallel, primary waves Wb. The primary waves Wb are then reflected by the individual acoustic focusing devices 124*b* as secondary waves Wb' directed specifically at each individual aperture 112*b*. In an alternative configuration, not specifically shown, multiple acoustic focusing devices 124*b* can be used, but with each focusing device 124*b* focusing on more than one aperture 112*b*.

In one particular configuration shown in FIG. 6, a distance between similar points on adjacent acoustic focusing devices $d_1$ can be equal to a distance $d_2$ between similar points on adjacent apertures 112*b*, though other configurations can be used.

Referring to FIG. 7, a cross section of a material applicator 10*c* of a third construction is illustrated. The material applicator 10*c* is similar to the material applicator 10, 10*a*, or 10*b* (FIGS. 1-6) except as otherwise shown or described herein. Features denoted with reference numerals similar to those shown and described in FIGS. 1-6 are similar to those features of applicator 10, 10*a* and 10*b* and only differences are described herein. In the example provided, the micro-applicator plate 114*c* is not supported by or oscillated by the actuator 120*c*. Instead, the acoustic focusing device 124*c* is an acoustic lens disposed between the micro-applicator plate 114*c* and the actuator 120*c*. In the example provided, the acoustic focusing device 124*c* defines the back wall 131*c* and has a concave shape such that the back wall 131*c* is concave in a direction that faces toward the micro-applicator plate 114*c*. Activation of the actuator 120*c* creates primary waves Wc that propagate toward the acoustic focusing device 124*c*. The shape of the acoustic focusing device 124*c* focuses the acoustic waves so that the secondary waves Wc' (i.e., that pass through the acoustic focusing device 124*c*) are focused toward the apertures 112*c*. In the example provided, the secondary waves Wc' are focused toward a plurality of the apertures 112*c*. The space between the actuator 120*c* and the acoustic focusing device 124*c* can be any suitable gas, liquid, or solid for propagating the primary waves Wc, or the actuator 120*c* can be in direct contact with the acoustic focusing device 124*c*.

Referring to FIG. 8, a cross section of a material applicator 10*d* of a fourth construction is illustrated. The material applicator 10*d* is similar to the material applicator 10*c* (FIG. 7) except as otherwise shown or described herein. Features denoted with reference numerals similar to those shown and described in FIG. 7 are similar to those features of applicator 10*c* and only differences are described herein. In the example provided, the acoustic focusing device 124*d* is an acoustic lens that defines the back wall 131*d*, but has a shape that is not concave. Instead, the acoustic focusing device 124*d* is constructed so that the speed of sound through the acoustic focusing device 124*d* varies across the acoustic focusing device 124*d* in a manner that results in the acoustic focusing device 124*d* focusing the secondary waves Wd' toward the apertures 112*d*. In one non-limiting example, the acoustic focusing device 124*d* can be constructed with different densities to cause the speed of sound to vary across the acoustic focusing device 124*d*, though other configurations can be used. In the example provided, the secondary waves Wd' are focused toward a plurality of the apertures 112*d*. In an alternative construction, the speed of sound can vary across the acoustic focusing device 124*d* and the acoustic focusing device 124*d* can have a concave shape.

Referring to FIG. 9, a cross section of a material applicator 10*e* of a fifth construction is illustrated. The material applicator 10*e* is similar to the material applicator 10*c* (FIG. 7) except as otherwise shown or described herein. Features denoted with reference numerals similar to those shown and described in FIG. 7 are similar to those features of applicator 10*c* and only differences are described herein. In the example provided, the micro-applicator 110*e* includes a plurality of acoustic focusing devices 124*e* that are acoustic lenses that define portions of the back wall 131*e* that have concave shapes that face toward the apertures 112*e*. The shapes of the acoustic focusing devices 124*c* focus the acoustic waves so that the secondary waves We' are focused toward an individual corresponding one of the apertures 112*e*.

Referring to FIG. 10, a cross section of a material applicator 10*f* of a sixth construction is illustrated. The material applicator 10*f* is similar to the material applicator 10*e* (FIG. 9) except as otherwise shown or described herein. Features denoted with reference numerals similar to those shown and described in FIG. 9 are similar to those features of applicator 10*e* and only differences are described herein. In the example provided, the acoustic focusing devices 124*f* are acoustic lenses that define portions of the back wall 131*f*, but the acoustic focusing devices 124*f* have a shape that is not concave. Instead, the acoustic focusing devices 124*f* are constructed so that the speed of sound through the acoustic focusing devices 124*f* varies across the acoustic focusing devices 124*f* in a manner that results in the acoustic focusing devices 124*f* focusing the secondary waves Wf' toward individual corresponding ones of the apertures 112*f*. In one non-limiting example, the acoustic focusing device 124*f* can be constructed with different densities to cause the speed of sound to vary across the acoustic focusing device 124*f*, though other configurations can be used. In an alternative construction, the speed of sound can vary across the acoustic focusing devices 124*f* and the acoustic focusing devices 124*f* can have a concave shape.

Referring to FIG. 11, a cross-section of a material applicator 10*g* of a seventh construction is illustrated. The material applicator 10*g* is similar to the material applicator 10 and 10*a* (FIGS. 1-4) except as otherwise shown or described herein. Features denoted with reference numerals similar to those shown and described in FIGS. 1-4 are similar to those features of applicator 10, 10*a* and only differences are described herein. In the example provided, the micro-applicator plate 114*g* is not supported by or oscillated by the actuator 120*g*. Instead, the actuator 120*g* defines at least a portion of the back wall 131*g* and has a concave shape that faces toward the micro-applicator plate 114*g*. The shape of the actuator 120*g* is such that it produces waves Wg that are already focused toward the apertures 112*g*. Thus, the actuator 120*g* itself forms an acoustic focusing device 124*g*. In the example provided, the waves Wg are focused toward a plurality of the apertures 112*g*.

Referring to FIG. 12, a cross section of a material applicator 10*h* of an eighth construction is illustrated. The material applicator 10*h* is similar to the material applicator 10*g* (FIG. 11) except as otherwise shown or described herein. Features denoted with reference numerals similar to those shown and described in FIG. 11 are similar to those features of applicator 10*g* and only differences are described herein. In the example provided, the micro-applicator 110*h* includes a plurality of actuators 120*h* that define portions of the back wall 131*h* that have concave shapes that face toward the apertures 112*h*. The shapes of the actuators 120*h* form acoustic focusing devices 124*h* such that activating the actuators 120*h* propagates focuses acoustic waves Wh that are focused toward an individual corresponding one of the apertures 112*h*.

Accordingly, the acoustic focusing devices 124*a-h* focus the acoustic waves toward the apertures 112*a-h*, which can result in greater power efficiency (e.g., lower electrical power needed) and higher droplet ejection velocity, which can also reduce overspray and allow for higher viscosity fluids to be used.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An atomizer for applying a coating comprising:

a nozzle plate defining a plurality of apertures;

an actuator configured to oscillate the nozzle plate to form pressure waves within a fluid to eject the fluid from the nozzle plate; and an acoustic reflector that includes a rigid concave shaped surface facing toward the nozzle plate configured to reflect the pressure waves back toward the nozzle plate as secondary pressure waves and focus the secondary pressure waves toward the plurality of apertures, the acoustic reflector having a focal point that is exterior of an exterior side of the nozzle plate such that the nozzle plate is between the acoustic reflector and the focal point and the acoustic reflector focuses the secondary pressure waves across more than one aperture of the plurality of apertures.

2. The atomizer of claim 1, further comprising a plurality of the acoustic reflectors configured to split the pressure waves into discrete sets of the plurality of secondary pressure waves, each acoustic reflector focusing a corresponding set of the discrete sets toward a corresponding set of apertures of the plurality of apertures.

3. The atomizer of claim 1, further comprising a plurality of the nozzle plates and a plurality of the actuators, each actuator configured to oscillate a corresponding one of the nozzle plates, wherein the atomizer includes a plurality of acoustic reflectors, each acoustic reflector associated with a corresponding one of the nozzle plates.

4. The atomizer of claim 3, wherein each acoustic reflector defines a plurality of the rigid concave shaped surfaces and is configured to split the pressure waves into discrete sets of the plurality of secondary pressure waves with each rigid concave shaped surface focusing a corresponding set of the discrete sets toward a corresponding set of apertures of the plurality of apertures of the corresponding nozzle plate.

5. The atomizer of claim 1, wherein the actuator is integrally formed with the nozzle plate.

6. The atomizer of claim 1, wherein the actuator is piezoelectric material.

7. The atomizer of claim 1, wherein the nozzle plate is a piezoelectric material and defines the actuator.

8. The atomizer of claim 1, wherein the actuator is configured to oscillate the nozzle plate such that the pressure waves originate from the nozzle plate and propagate therefrom toward the acoustic reflector.

9. The atomizer of claim 1, wherein the actuator is an annular shape disposed about the nozzle plate.

10. An atomizer for applying a coating comprising:

a nozzle plate defining a plurality of apertures;

an actuator configured to oscillate the nozzle plate to form a pressure wavefront in a fluid that propagates from the nozzle plate; and at least one acoustic reflector that has a rigid concave shaped surface facing toward the nozzle plate configured to reflect the pressure wavefront back toward the nozzle plate as secondary pressure waves and focus the secondary pressure waves toward at least one aperture of the plurality of apertures, every acoustic reflector of the at least one acoustic reflector having a focal point that is exterior of an exterior side of the nozzle plate such that the nozzle plate is between the acoustic reflector and the focal point and the acoustic reflector focuses the secondary pressure waves across more than one aperture of the plurality of apertures.

11. The atomizer of claim 10, wherein the at least one acoustic reflector includes a second acoustic reflector, the rigid concave shaped surface of the second acoustic reflector being configured to focus the secondary pressure waves toward a corresponding set of apertures of the plurality of apertures.

12. The atomizer of claim 10, wherein the at least one acoustic reflector includes a plurality of acoustic reflectors configured to split the pressure waves into discrete sets of the plurality of secondary pressure waves, each acoustic reflector focusing a corresponding set of the discrete sets toward a corresponding one of the apertures.

13. The atomizer of claim 10 further comprising a plurality of the nozzle plates and a plurality of the actuators, each actuator configured to oscillate a corresponding one of the nozzle plates, wherein the at least one acoustic reflector includes a plurality of acoustic reflectors, each acoustic reflector associated with a corresponding one of the nozzle plates.

14. The atomizer of claim 10, wherein the nozzle plate is a piezoelectric material and defines the actuator.

15. The atomizer of claim 10, wherein the actuator is an annular shape disposed about the nozzle plate.

16. An atomizer for applying a coating comprising:

a plurality of nozzle plates, each nozzle plate defining a plurality of apertures;

a plurality of actuators; and a plurality of acoustic reflectors, wherein each nozzle plate is associated with a corresponding one of the actuators of the plurality of actuators and a corresponding one of the acoustic reflectors of the plurality of acoustic reflectors, wherein each actuator is configured to oscillate the associated nozzle plate to form pressure waves within a fluid to eject the fluid from the associated nozzle plate, wherein each acoustic reflector defines a plurality of concave shaped surfaces that face toward the associated nozzle plate and are configured to split the pressure waves into discrete sets of secondary pressure waves that are reflected back toward the associated nozzle plate, wherein each concave shaped surface of the plurality of concave shaped surfaces focuses a corresponding set of the discrete sets toward a corresponding set of apertures of the plurality of apertures of the associated nozzle plate.

* * * * *